(12) United States Patent
Shue et al.

(10) Patent No.: US 10,294,850 B2
(45) Date of Patent: May 21, 2019

(54) ENGINE COOLING SYSTEM HAVING A LOW SPEED COOLING PACKAGE FAN

(71) Applicant: Vermeer Manufacturing Company, Pella, IA (US)

(72) Inventors: Christopher Glen Shue, Pella, IA (US); Timothy Jon Whitcomb, Mystic, IA (US); Benjamin Kenneth Downing, Reasnor, IA (US)

(73) Assignee: Vermeer Manufacturing Company, Pella, IA (US)

( * ) Notice: Subject to any disclaimer, the term of this patent is extended or adjusted under 35 U.S.C. 154(b) by 30 days.

(21) Appl. No.: 15/130,278

(22) Filed: Apr. 15, 2016

(65) Prior Publication Data

US 2016/0305307 A1     Oct. 20, 2016

Related U.S. Application Data

(60) Provisional application No. 62/149,147, filed on Apr. 17, 2015.

(51) Int. Cl.
*F01P 5/04* (2006.01)
*E21B 7/04* (2006.01)
(Continued)

(52) U.S. Cl.
CPC ........... *F01P 5/04* (2013.01); *B60K 11/02* (2013.01); *B60K 11/04* (2013.01); *E21B 7/02* (2013.01);
(Continued)

(58) Field of Classification Search
CPC . E21B 7/02; E21B 7/046; E21B 7/028; E21B 7/20; F01P 3/18; F01P 2070/50
See application file for complete search history.

(56) References Cited

U.S. PATENT DOCUMENTS 2,966,221 A * 12/1960 Kinney ................... E21B 19/09
173/151
3,470,968 A * 10/1969 Melsheimer ............ E21B 19/08
173/164
(Continued)

FOREIGN PATENT DOCUMENTS

JP         11-263131        9/1999
WO       2006/012962       2/2006

OTHER PUBLICATIONS

Dynapac, "CP274 Pneumatic Tired Roller Offers Compaction, Comfort," Apr. 9, 2010, obtained from www.constructionequipmentguide.com (3 pages).
(Continued)

*Primary Examiner* — Long T Tran
(74) *Attorney, Agent, or Firm* — Merchant & Gould P.C.

(57) ABSTRACT

A machine engine enclosure arrangement that has sound reducing elements allows for the overall sound rating of the machine to be decreased. The engine enclosure includes a housing that has a housing length and a housing width. The housing defines a housing axis that extends along the housing length and the housing axis defines a vertical reference plane. The vertical reference plane is perpendicular to a ground surface on which machine is resting. The engine enclosure further includes a radiator fan that is configured to provide air flow across the radiator. The radiator fan has a diameter greater than the housing width and defines a fan plane perpendicular to an axis of rotation of the radiator fan. The radiator fan is positioned between the side walls of the housing so that the fan plane is at a non-perpendicular angle with respect to the vertical reference plane.

14 Claims, 16 Drawing Sheets

(51) Int. Cl.
    *B60K 11/02*     (2006.01)
    *B60K 11/04*     (2006.01)
    *E21B 7/02*     (2006.01)
    *F01P 3/18*     (2006.01)
    *F01P 7/12*     (2006.01)

(52) U.S. Cl.
    CPC ................ *E21B 7/046* (2013.01); *F01P 3/18* (2013.01); *F01P 7/12* (2013.01); *B60Y 2200/41* (2013.01)

(56) References Cited

U.S. PATENT DOCUMENTS

| | | | |
|---|---|---|---|
| 4,116,269 A | 9/1978 | Ikeda | |
| 4,334,588 A | 6/1982 | Tezuka et al. | |
| 4,348,990 A | 9/1982 | Nolte et al. | |
| 4,371,041 A * | 2/1983 | Becker | E21B 3/02 173/147 |
| 4,585,080 A * | 4/1986 | Bender | E21B 7/024 173/29 |
| 4,976,321 A * | 12/1990 | Van Meter | E21B 3/02 173/170 |
| 5,236,054 A * | 8/1993 | Jack | E21B 7/028 175/57 |
| 5,531,190 A | 7/1996 | Mork | |
| 6,435,264 B1 * | 8/2002 | Konno | B60K 11/04 123/41.49 |
| 6,453,853 B1 | 9/2002 | Hawkins et al. | |
| 6,571,751 B2 | 6/2003 | Vogt | |
| 6,817,831 B2 | 11/2004 | Stevens et al. | |
| 7,347,167 B2 | 3/2008 | Sugiyama et al. | |
| 7,497,250 B2 | 3/2009 | Coy et al. | |
| 7,863,839 B2 | 1/2011 | Schuricht et al. | |
| 8,844,279 B2 | 9/2014 | Nelson et al. | |
| 2002/0053480 A1 | 5/2002 | Pack | |
| 2006/0205328 A1 * | 9/2006 | Liao | B24B 3/02 451/48 |
| 2009/0126528 A1 * | 5/2009 | Sakamoto | E02F 3/964 74/594.4 |
| 2011/0214844 A1 * | 9/2011 | Jacobsson | F01P 5/06 165/104.34 |
| 2012/0247728 A1 | 10/2012 | Johnson | |
| 2013/0240269 A1 * | 9/2013 | Novelo | E21B 19/20 175/85 |
| 2013/0319778 A1 | 12/2013 | MacGregor et al. | |
| 2014/0151120 A1 * | 6/2014 | Ledbetter | E21B 7/025 175/24 |
| 2015/0225926 A1 * | 8/2015 | Hutchinson | E02F 9/0866 414/685 |

OTHER PUBLICATIONS

Partial European Search Report for Application No. 16165636.8, dated Aug. 31, 2016 (13 pages).
Smith, Jeff, "Cool is the Rule, Exclusive Tips and Tricks to Prevent That Slow Boil," Aug. 1, 1997, obtained from www.hotrod.com/how-to-engine/cooling-system-tech (5 pages).
Machine Translation of International Patent Application WO2006012962 (European Patent Office—Patent Translate); 6 Pages; Dated Jul. 9, 2018.

* cited by examiner

ENGINE COOLING SYSTEM HAVING A LOW SPEED COOLING PACKAGE FAN

CROSS REFERENCE TO RELATED APPLICATION

This application claims the benefit of U.S. Provisional Patent Application Ser. No. 62/149,147, filed Apr. 17, 2015, which application is hereby incorporated by reference in its entirety.

BACKGROUND

Directional drilling machines and methods for making underground holes are known. A directional drilling machine is generally configured to drive into the ground a series of drill rods joined end-to-end to form a drill string. At the end of the drill string is a rotating drilling tool. Various techniques and configurations can be used to provide rotational and thrust power to the drill string. Often an internal combustion engine is mounted to the boring machine and is used to provide such power.

In order to meet certain safety specifications, the internal combustion engine on the drilling machine must operate within a certain loudness range. Loudness is the subjective human response to sound. Loudness depends primarily on sound pressure but is also influenced by frequency. In order to measure loudness, a weighted scale is often used, which is referred to as an A-weighted scale (i.e., dB(A)). The A-weighted sound level measurement is thought to provide a rating of industrial noise that indicates the injurious effects such noise has on human hearing and has been adopted by OSHA in its noise standards (OTM/Driscoll). Therefore, there is an advantage to having the internal combustion engine and its components operate at lower frequencies (i.e. a lower dB(A) rating) which are safer for the human ear.

The use of a radiator and radiator fan with internal combustion engines is common. The faster the speed the radiator fan is operating at, the more sound the fan produces and the louder the overall machine to which the fan is attached. However, in order to operate effectively, a certain amount of airflow created by the radiator fan is required to move across the radiator to ensure proper cooling of the fluids within the radiator. Without proper cooling, the internal combustion engine risks overheating, potentially leading to failure or malfunction. Diameter of the fan, speed of the fan, and individual fan blade pitch affect the amount of airflow moved by the fan. The larger the diameter of the fan, the lower the speed the fan may operate at to move the required amount of air. However, space within engine compartments is a premium, so increasing the size of the fan is not a straightforward solution as proximity of the fan to the radiator is important to effective operation of the radiator. In addition, larger fans require more power to be operated, thereby decreasing the efficiency of the overall system.

Therefore, improvements in sound reduction with respect to internal combustion engines and their components on directional drilling machines are needed.

SUMMARY

The present disclosure relates generally to sound reduction measures with respect to an engine compartment. In one possible configuration, and by non-limiting example, the engine compartment includes a radiator fan positioned at an angle with respect to the engine compartment.

In a first aspect of the present disclosure, an engine enclosure is disclosed. The engine enclosure includes a housing that has a housing length and a housing width. The housing defines a housing axis that extends along the housing length, and the housing axis defines a vertical reference plane. The vertical reference plane is perpendicular to a ground surface on which the engine enclosure is resting. The housing also includes a plurality of side walls that extend along the housing length. The housing width is defined between the side walls. The engine enclosure also includes an internal combustion engine positioned within the housing and a radiator positioned within the housing. The engine enclosure further includes a radiator fan that is configured to provide air flow across the radiator. The radiator fan has a diameter greater than the housing width and defines a fan plane perpendicular to an axis of rotation of the radiator fan. The radiator fan is positioned between the side walls of the housing so that the fan plane is at a non-perpendicular angle with respect to the vertical reference plane.

In a second aspect of the present disclosure, a method of reducing noise in an engine compartment housing is disclosed. The method provides a housing that has a housing length and a housing width. The housing defines a housing axis that extends along the housing length, and the housing axis defines a vertical reference plane. The vertical reference plane is perpendicular to a ground surface on which the engine compartment housing rests. The housing also includes a plurality of side walls that extend along the housing length. The housing width is defined between the side walls. The method also includes positioning a radiator within the housing. The method further includes positioning a radiator fan proximate to the radiator. The radiator fan defines a fan plane perpendicular to an axis of rotation of the radiator fan. The radiator fan is positioned between the side walls of the housing so that the fan plane is at a non-perpendicular angle with respect to the vertical reference plane. The method also includes operating the radiator fan at a maximum blade pass frequency of about 220 hertz to provide air flow across the radiator.

In a third aspect of the present disclosure, a cooling system is disclosed. The cooling system includes an internal combustion engine that uses a coolant fluid. The cooling system also includes a radiator in fluid communication with the coolant fluid of the engine. The cooling system further includes a radiator fan configured to provide air flow across the radiator. The radiator fan is configured to rotate at no more than a maximum blade frequency of about 220 hertz. The cooling system also includes a hydraulic motor coupled to the fan. The hydraulic motor includes a valve configured to control the output of the hydraulic motor by altering the flow of hydraulic fluid through the hydraulic motor. The cooling system also includes a controller that is configured to use the temperature of the hydraulic fluid in a hydraulic reservoir and the temperature of the engine coolant fluid to control the operation of the valve.

In a fourth aspect of the present disclosure, a horizontal directional drilling machine is disclosed. The horizontal directional drilling machine includes a drilling assembly that is adapted to be coupled to a proximate end of a drill string and generally configured for applying a thrust and rotational force to the drill string. The horizontal directional drilling machine includes a housing that has a housing length and a housing width. The housing defines a housing axis that extends along the housing length. The housing includes a plurality of side walls that extend along the housing length. The housing width is defined between the side walls. The housing further includes a convertible hood being pivotable between an open and closed position along a hinge. The hinge is positioned at a compound angle with respect to the housing axis. The horizontal directional drilling machine also includes an internal combustion engine positioned within the housing, the internal combustion engine being operably coupled to the drilling assembly.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
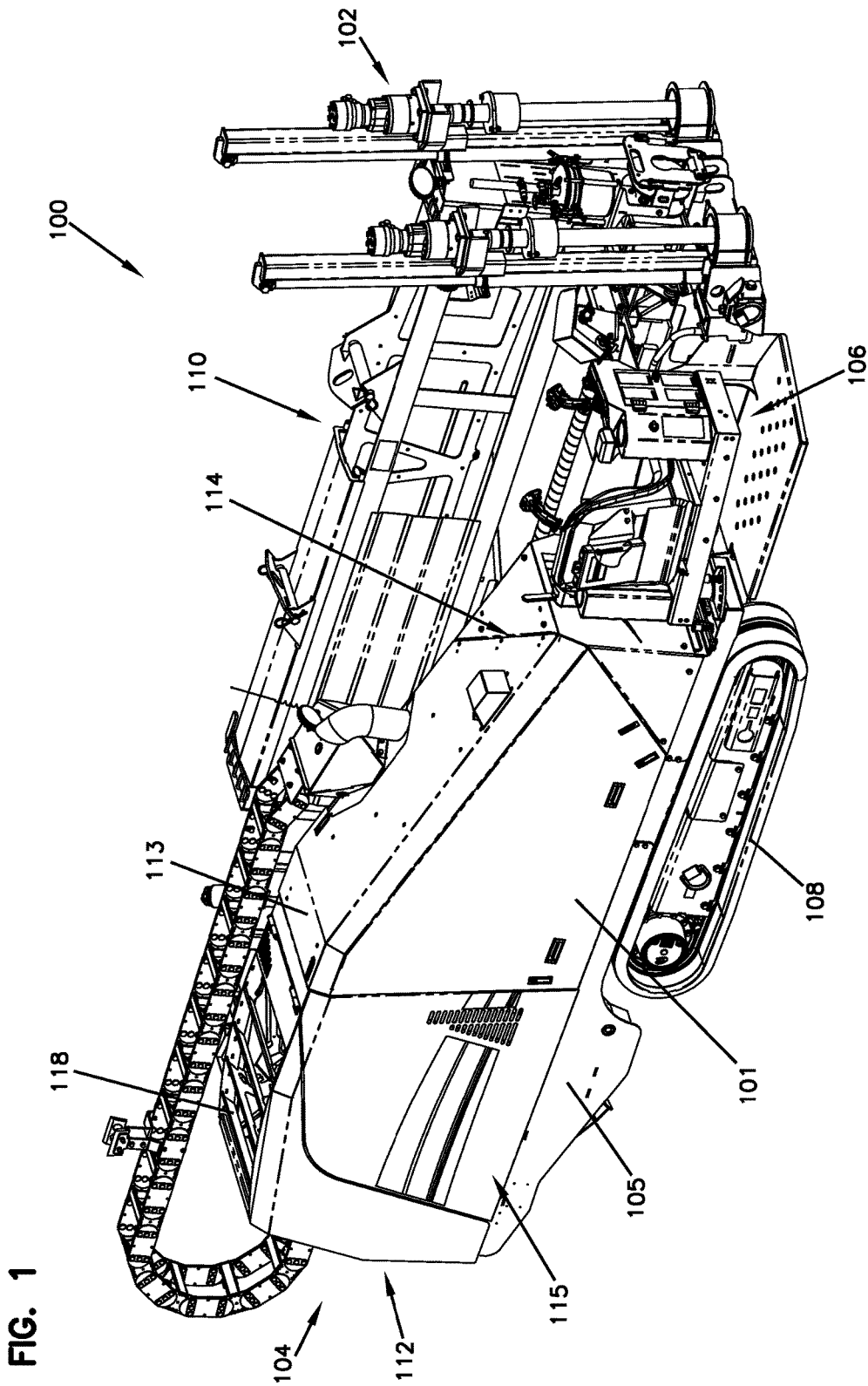
FIG. 1 illustrates a perspective view of a directional drilling machine with a hood in the closed position, according to one embodiment of the present disclosure.
Figure 2:
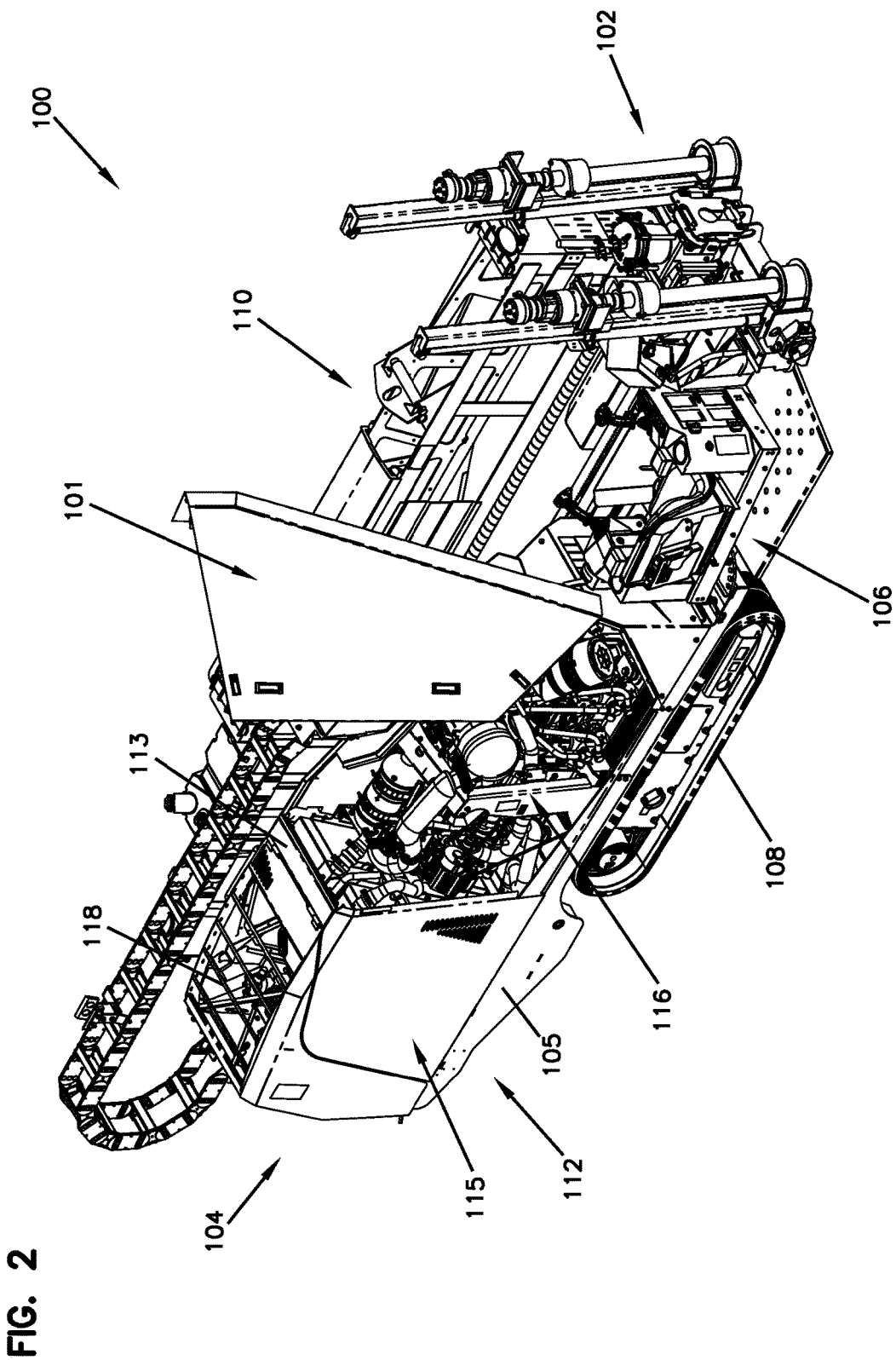
FIG. 2 illustrates a perspective view of the directional drilling machine of FIG. 1 with the hood in the open position.
Figure 3:
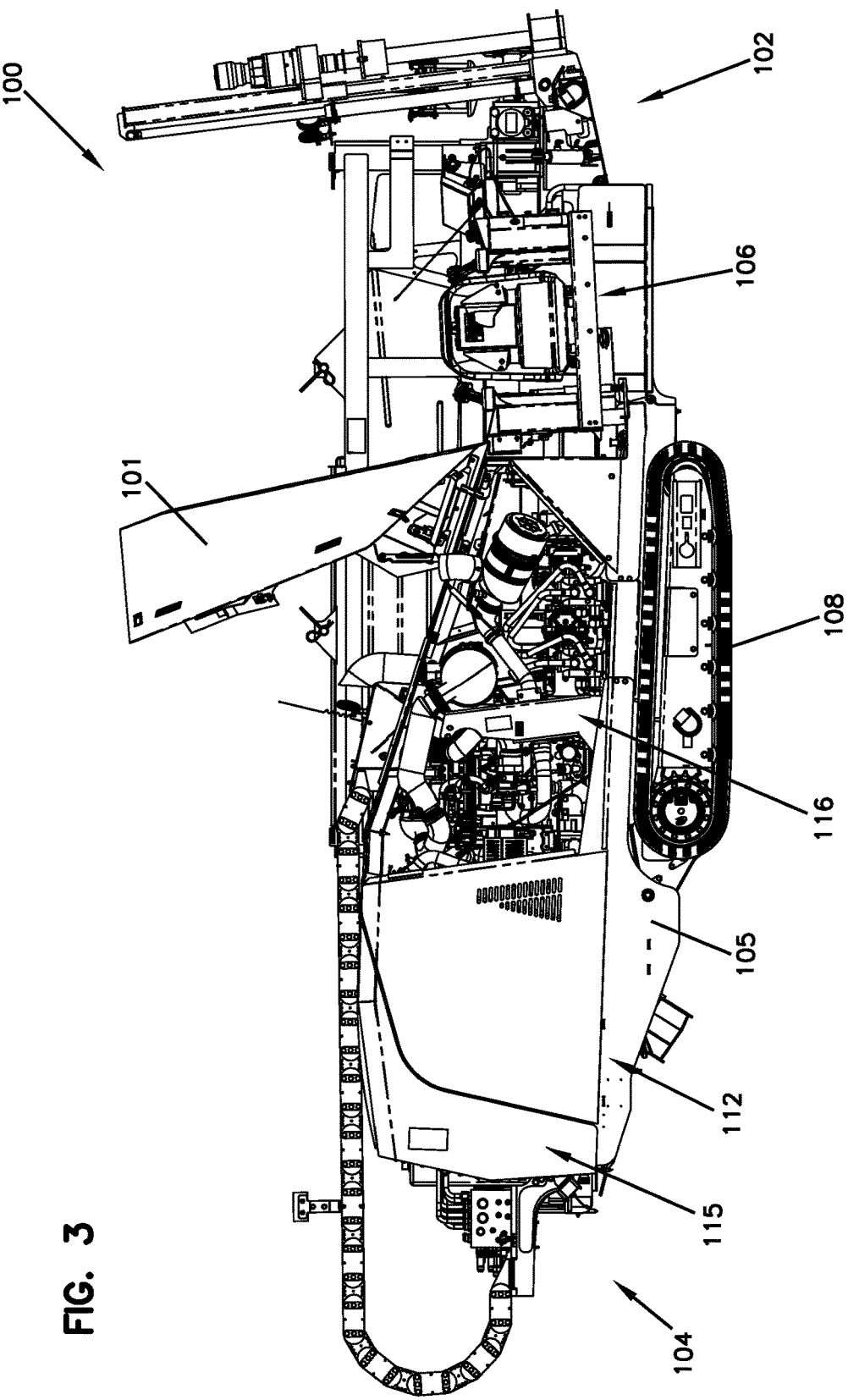
FIG. 3 illustrates a side view of the directional drilling machine of FIG. 1 with the hood in the open position.
Figure 4:
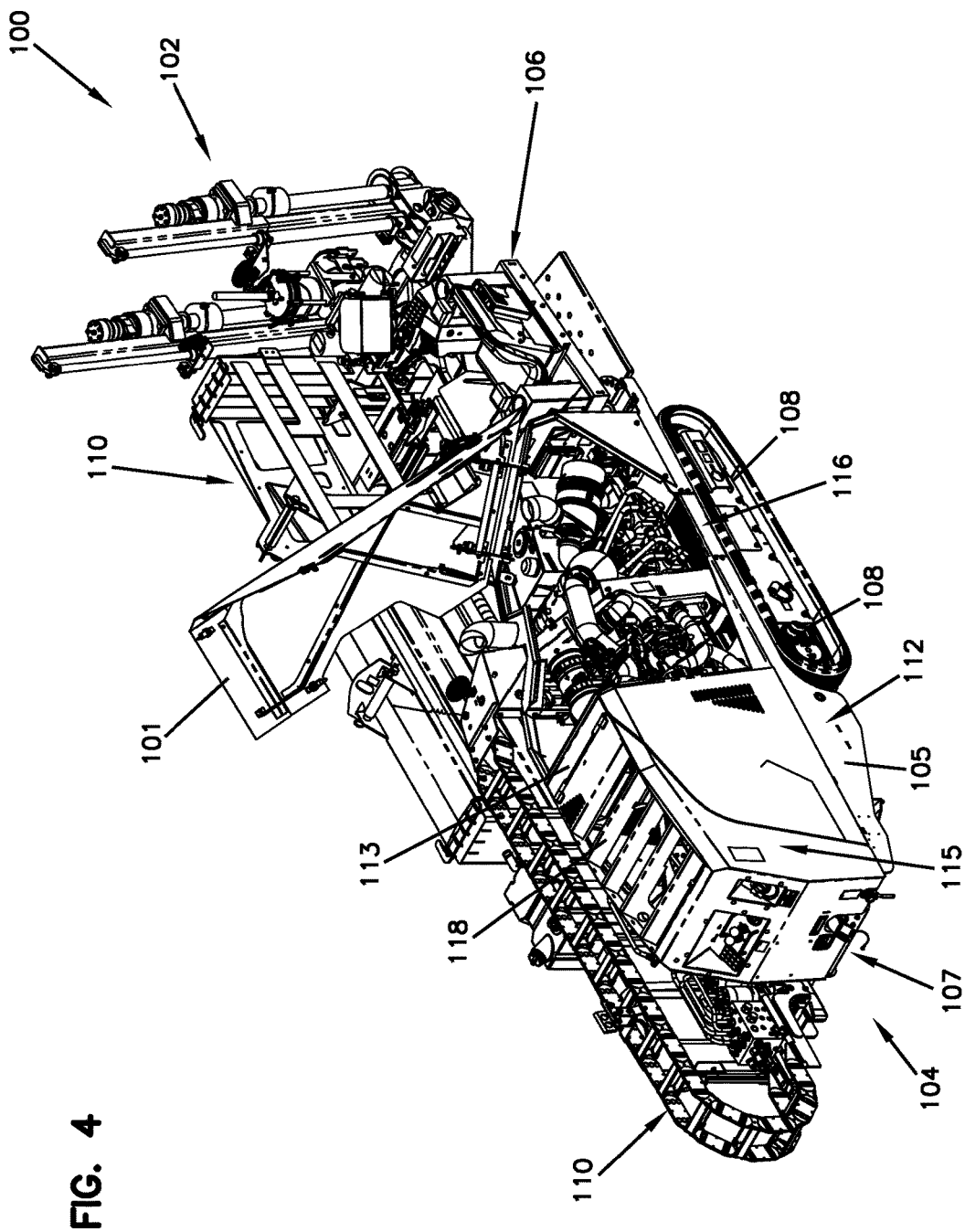
FIG. 4 illustrates a rear perspective view of the directional drilling machine of FIG. 1 with the hood in the open position.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The directional drilling machine of the present disclosure includes sound reduction measures to lower the overall sound rating of the machine. One example is a radiator fan positioned at an angle within the engine housing. The machine can also include a plurality of louvers to direct the sound of the machine in a particular direction.

FIG. 1 depicts directional drilling machine 100 with an engine housing hood 101 in a closed position. FIGS. 2-5 show the directional drilling machine 100 from a variety of angles with the hood 101 in an open position. The directional drilling machine 100 includes a front end 102 and a rear end 104. The directional drilling machine 100 also includes a frame 105, an operator's station 106, a pair of tracks 108, a drilling assembly 110, and an engine housing 112. The directional drilling machine 100 is configured to drive a drill string along a generally horizontal path underground.

The hood 101 is configured to be movable between a closed position (shown in FIG. 1) and an open position (shown in FIGS. 2-5). The hood 101 is pivotable about a hinge 114. The hinge 114 is configured to allow the hood to pivot up and away from the rest of the engine housing 112, in a direction toward the front end 102 of the directional drilling machine 100, to allow sufficient access to a variety of engine components 116. Pivoting the hood 101 along the hinge 114 allows the hood to be opened when there is a low ceiling height and also when there is limited room next to the engine housing 112 (i.e., when the directional drilling machine is on a trailer). Additionally, such a pivot along the hinge 114 allows a technician ample head room to perform maintenance and also provides uninhibited access to a majority of the engine components.

The frame 105 is configured to support the operator's station 106, drilling assembly 110, and engine housing 112. The frame 105 provides structural support to the directional drilling machine 100.

The operator's station 106 is positioned near the front end 102 of the directional drilling machine 100. The operator's station 106 is configured to allow an operator to control the operation of the directional drilling machine 100 from a seated position. In some embodiments, the directional drilling machine 100 also includes a rear operator's station 107 (shown in FIG. 4), positioned near the rear end 104 of the directional drilling machine 100.

The tracks 108 are configured to allow the operator to move the directional drilling machine 100. In some embodiments, the tracks 108 are less than a trailer width so that the directional drilling machine 100 may be transported long distances via a trailer on public roads. In some embodiments, drilling machine 100 may have a width so as to be transported next to a water tank on a flatbed trailer.

The drilling assembly 110 is configured to provide thrust and rotational force to the drill string during a drilling operation. Additionally, the drilling assembly 110 is configured to add and remove drill rods to and from the drill string. The drilling assembly 110 is powered by engine components 116 located within the engine housing 112.

The engine housing 112 is configured to cover the engine components 116 that enable the directional drilling machine 100 to operate. In some embodiments, the engine housing 112 is mounted to the frame 105 of the directional drilling machine 100. The engine housing 112 is configured to include a multitude of panels, some of which are removable. The engine housing 112 includes the hood 101, a radiator cover 113, and a rear housing portion 115. The engine housing 112 is configured to house the engine components 116 which can include an internal combustion engine and its components and a hydraulic system and its components. Because the drilling assembly 110 occupies a large portion of the directional drilling machine 100's overall size, the size of engine housing 112 (especially the width thereof) is limited in order to ensure the directional drilling machine 100 is transportable on public roads, specifically by trailer when transporting in combination with a water tank beside the drill.

The radiator cover 113 of the engine housing 112 is positioned on a top surface of the engine housing 112, between the hood 101 and the rear housing portion 115. In some embodiments, the radiator cover 113 is fixed to the engine components 116. The radiator cover 113 can help give the engine housing 112 rigidity. The radiator cover 113 is generally parallel with the frame 105.

The rear housing portion 115 can include a multitude of panels as well as a housing for the rear operator's station 107. In some embodiments, the rear housing portion 115 includes a plurality of louvers 118. The plurality of louvers 118 may, in one embodiment, be configured to direct sound coming from the engine housing 112 in a particular direction. For example, by choosing to position the louvers 118 so as to direct sound away from the operator, specifically when the operator is at the rear operator's station 107, the operator's perceived loudness of the directional drilling machine 100 is reduced. In the depicted embodiment, the louvers 118 are fixed to the engine housing 112, angled in a direction toward the front end 102 of the directional drilling machine 100. In some embodiments, the louvers 118 can be maneuverable so as to direct sound, air, and fumes coming from the engine housing 112 in a customized direction. For example, when the operator is at the front end 102 of the directional drilling machine 100, the louvers 118 can, in such a variation, be maneuvered to point to the rear end 104 of the machine 100 and vice versa if the operator is at the rear operator's station 107.

Figure 5:
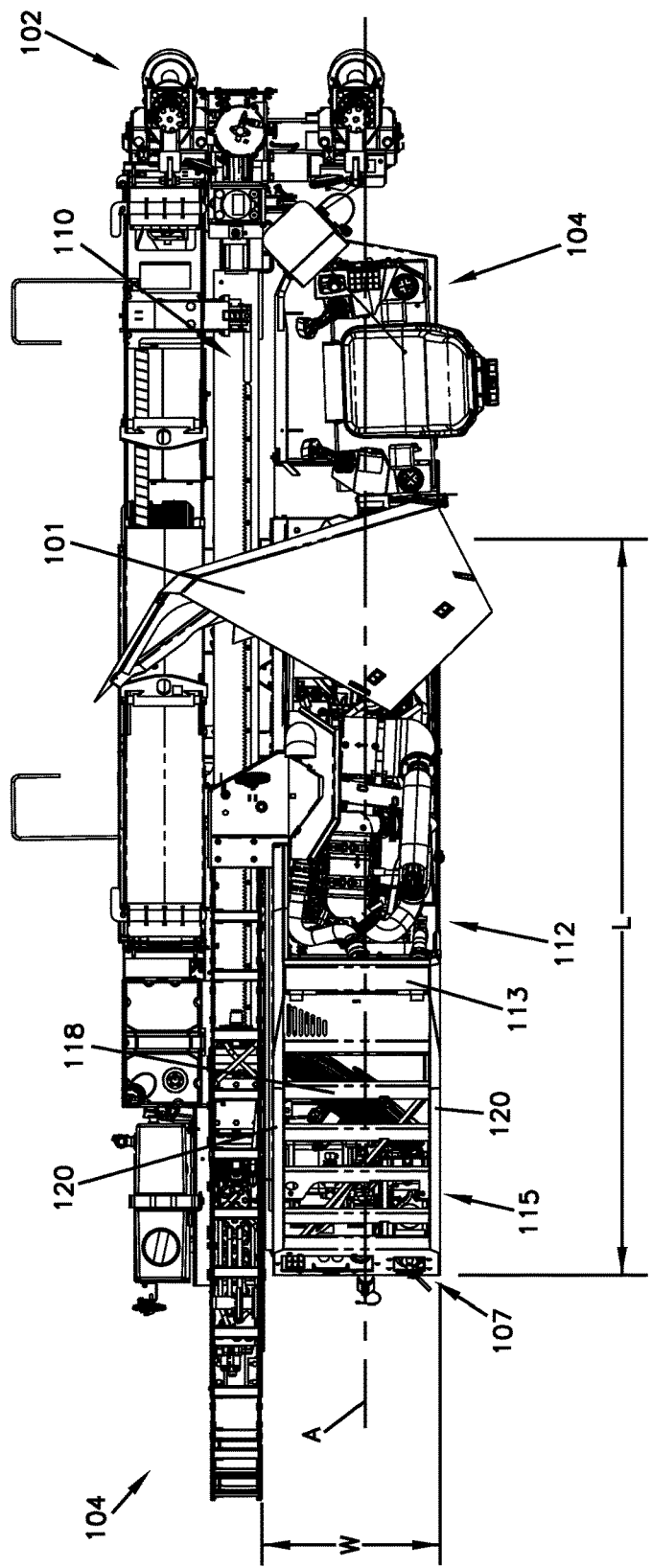
FIG. 5 illustrates a top view of the directional drilling machine of FIG. 1 with the hood in the open position.
Figure 6:
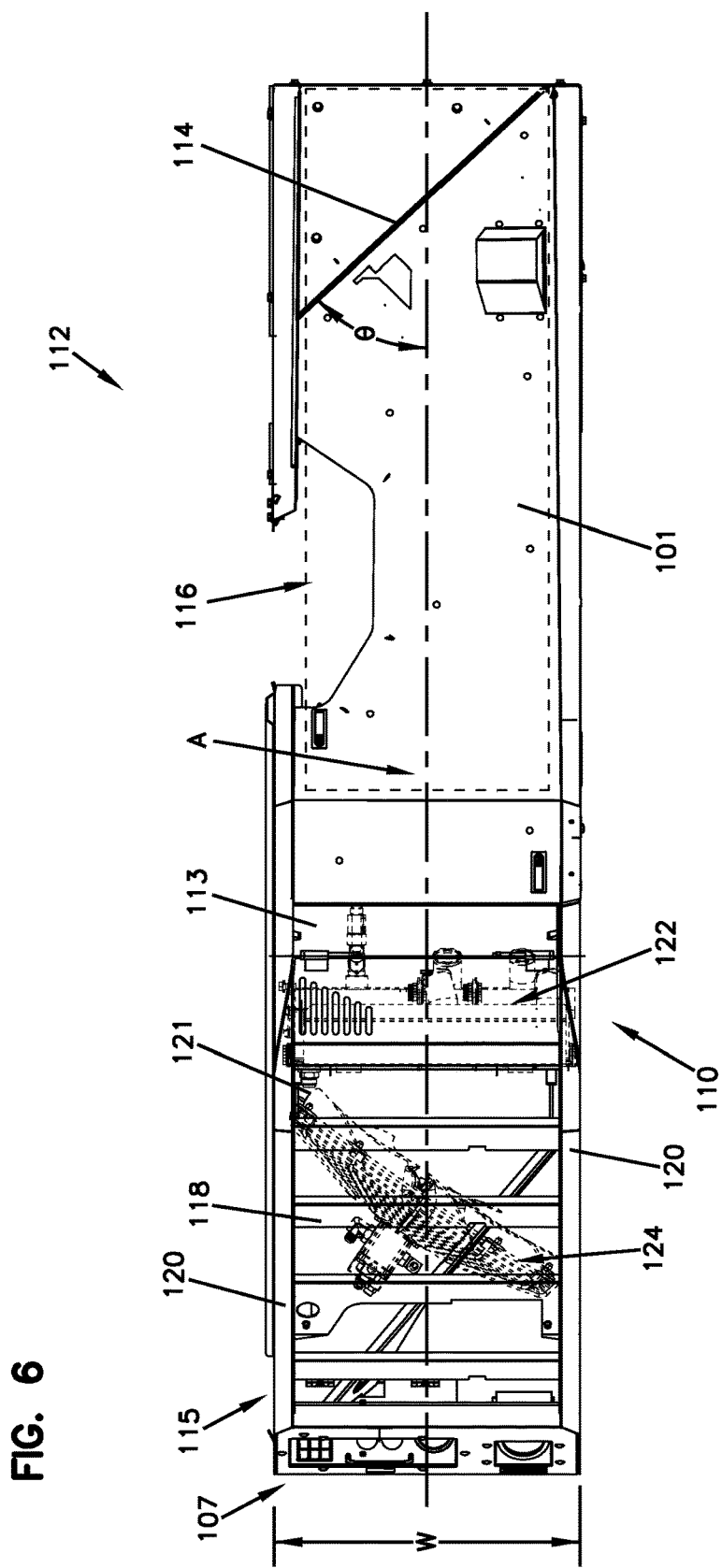
FIG. 6 illustrates a top view of the engine housing of the directional drilling machine of FIG. 1, according to one embodiment of the present disclosure.

FIG. 5 shows a top view of the directional drilling machine 100. Additionally, FIG. 6 shows a top view of the engine housing 112 alone, with the hood 101 in the closed position. The engine housing 112 has a length L and a width W, and the housing 112 defines a housing axis that defines a vertical reference plane A that extends along the housing length L and bisects the housing 112. The engine housing 112 further includes a plurality of side walls 120 that extend along the housing length L. The housing width W is defined between the side walls 120. In some embodiments, the vertical reference plane A is perpendicular to a ground surface on which the machine 100 is resting. In other embodiments, the vertical reference plane A is parallel to the side walls 120 of the engine housing 112.

FIG. 6 also shows the positioning of a select number of engine components 116. Specifically, a cooling package 121 that includes a radiator 122 and a radiator fan 124 is shown by hidden lines. The radiator 122 and radiator fan 124 are generally positioned within the engine housing 112, near the rear operator's station 107. The radiator fan 124 is positioned generally under the louvers 118 of the engine housing 112, and proximate to the radiator 122. In some embodiments, the radiator fan 124 is configured to provide airflow across the radiator 122 and expel air from the engine housing 112 past the louvers 118.

Also shown in FIG. 6, the hinge 114 of the hood 101 is positioned at an angle θ with respect to the vertical reference plane A. Angle θ is an acute angle. In some embodiments, angle θ is between 30 degrees and 60 degrees. In other embodiments, angle θ is about 48 degrees. By forming an angle θ with the vertical reference plane A, the hood 101 provides a greater amount of access and clearance to the engine components 116 when the hood is in the open position.

Figure 7:
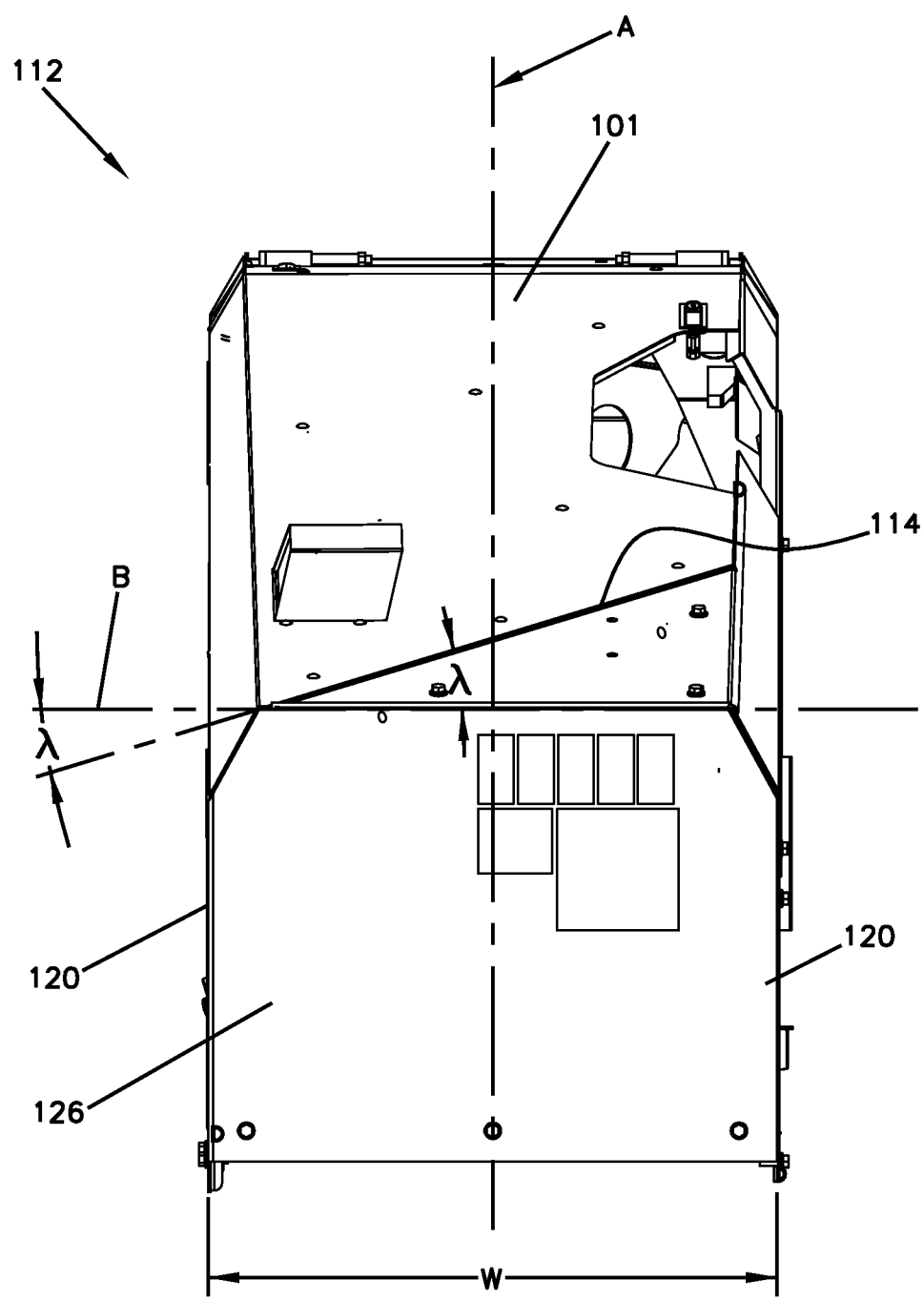
FIG. 7 illustrates a front view of the engine housing of FIG. 6.

FIG. 7 shows a front view of the engine housing 112 having the width W. The engine housing 112 includes a front wall 126. The front wall 126 is positioned near the front end 102 of the directional drilling machine 100, proximate the operator's station 106. A horizontal reference plane B, defined by the housing axis, positioned perpendicular to the vertical reference plane A is shown. The horizontal reference plane B bisects the engine housing 112 along the length L of the engine housing 112. Additionally, the hinge 114 of the hood 101 forms an angle λ with the horizontal reference plane B. The angle λ is an acute angle, which, by way of example, may be in the range of 15-45 degrees. By forming an acute angle λ, the hood 101 allows for a wider opening and access to the engine components 116 when the hood 101 is in the open position.

When combining angle θ and angle λ, an oblique angle is created. The oblique angle is preferably a compound angle including a miter angle/component λ and a bevel angle/component θ. The miter angle λ is defined relative to the horizontal reference plane B. The bevel angle θ is defined relative to the vertical reference plane A. In certain embodiments, both the miter angle λ and the bevel angle θ can be in the range of 15-45 degrees. Therefore, it can be said that the hinge 114 forms a compound angle with the engine housing 112.

Figure 8:
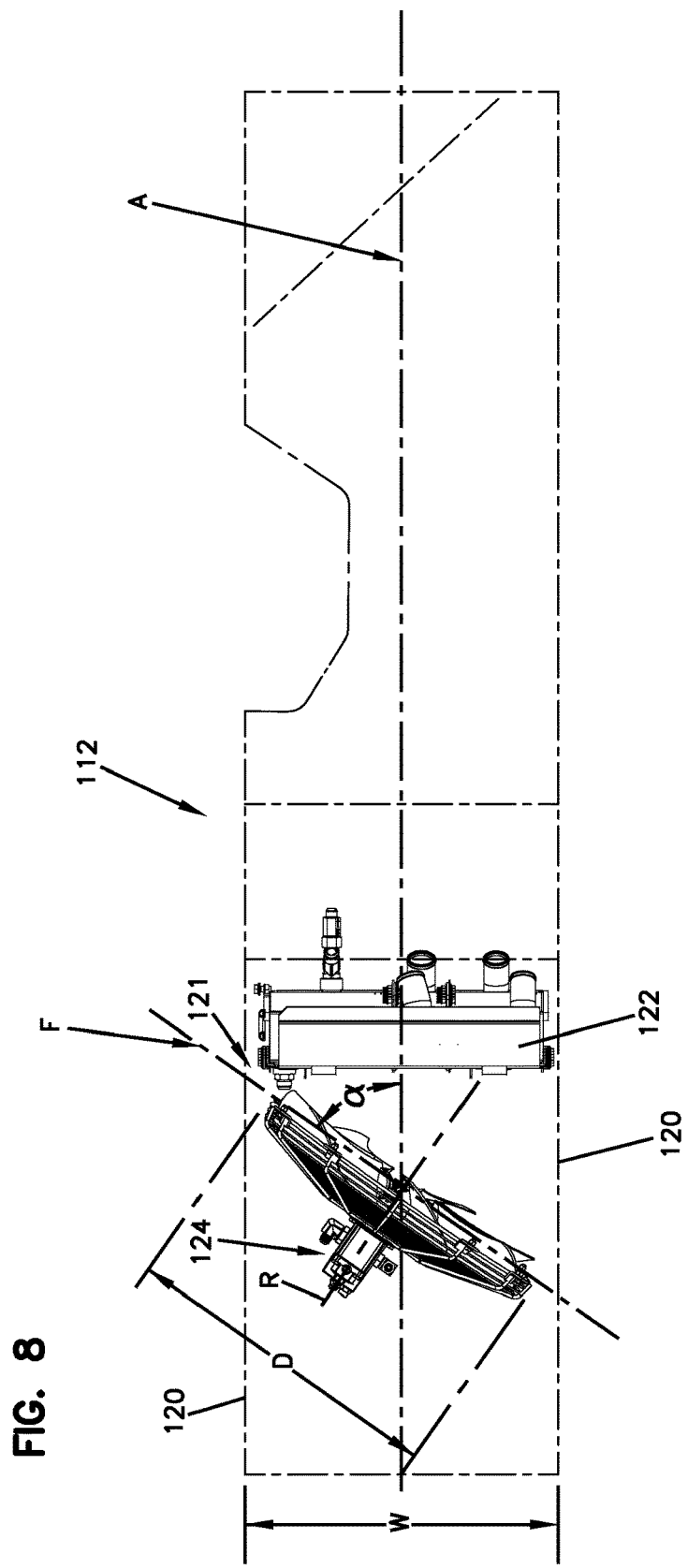
FIG. 8 illustrates a schematic top view of the engine housing of FIG. 6.

FIG. 8 shows a top view schematic of the positioning of the radiator 122 and the radiator fan 124 with respect to the engine housing 112. In the depicted embodiment, the fan 124 is generally circular and has a diameter D, which is greater than the housing width W. In some embodiments, the radiator fan 124 has a diameter D at least 1.05 times larger than the width W of the engine housing 112. In other embodiments, the radiator fan 124 has a diameter D at least 1.25 times larger than the width W of the engine housing 112.

In some embodiments, the interior width W is the width of the available space within the housing 112 proximate to the radiator 122 and radiator fan 124. In some embodiments, the housing 112 may include materials adhered to the interior side walls 120 of the engine housing 112 (i.e. firewall materials, sound deadening materials, etc.), thereby decreasing the overall interior width available for the radiator 122 and radiator fan 124 within the housing. Therefore, for sizing considerations, the width W of the available interior space within the engine housing 112 is important.

Figure 9:
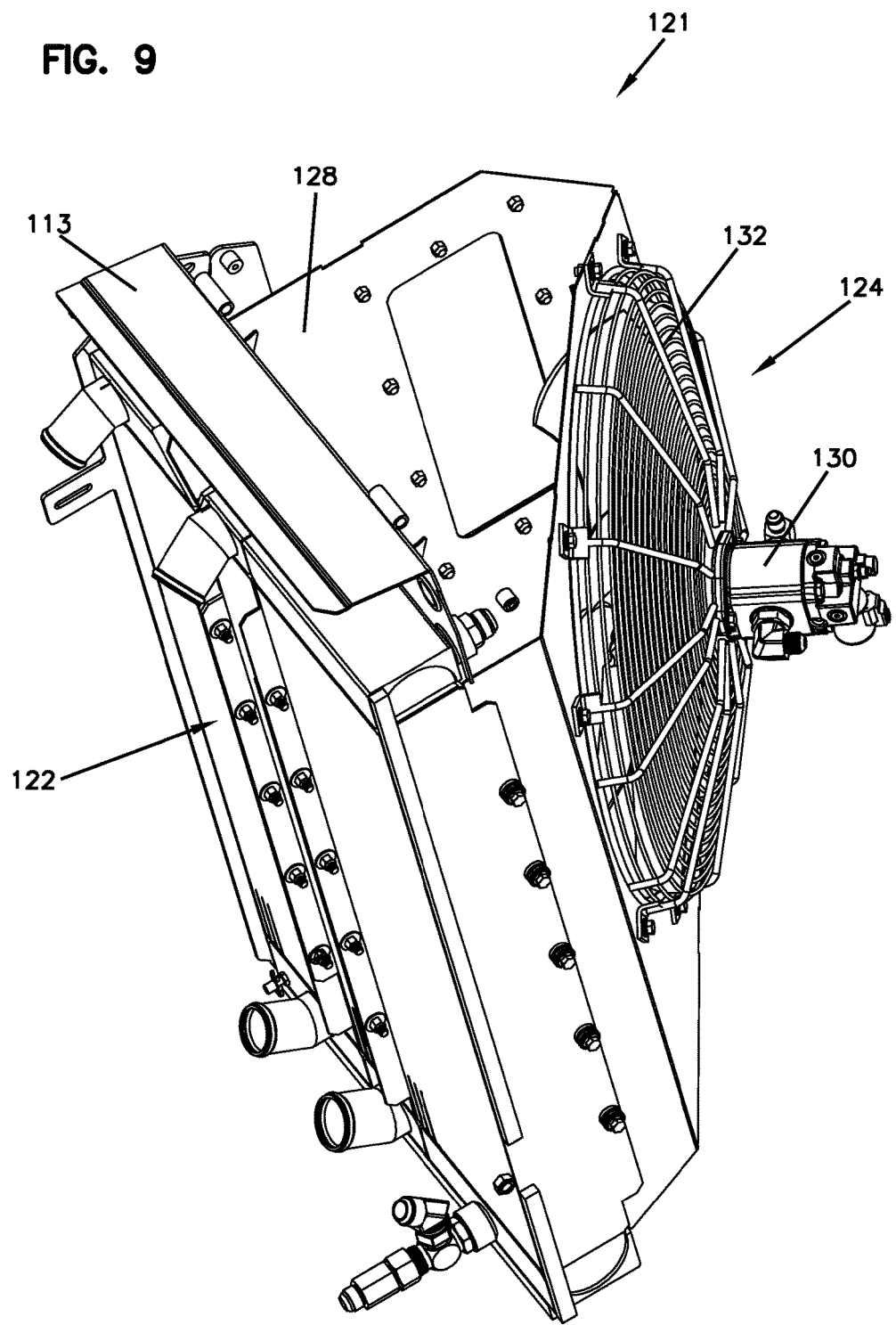
FIG. 9 illustrates a schematic view of a cooling package of the directional drilling machine of FIG. 1, according to one embodiment of the present disclosure.

Further, the radiator fan 124 defines a fan plane F perpendicular to an axis of rotation R of the radiator fan 124. The radiator fan 124 is positioned between the side walls 120 of the engine housing 112 so that the fan plane F is at a non-perpendicular angle α with respect to the vertical reference plane A. In some embodiments, the non-perpendicular angle α is between about 30 degrees and about 40 degrees. In other embodiments, the angle α is about 36 degrees FIG. 9 shows a perspective view of the cooling package 121. The cooling package 121 includes the radiator 122, the radiator cover 113, the radiator fan 124, and cladding 128. The cooling package 121 is configured to be paired with an internal combustion engine. In some embodiments, the cooling package includes a radiator, an oil cooler, and charge air cooler, or any combination thereof.

The radiator 122 is configured to cool an engine coolant of an internal combustion engine. This is accomplished by circulating a coolant through the engine, passing the coolant through the radiator 122, where the coolant loses heat to the atmosphere, and then passing the coolant back through the engine. In some embodiments, the radiator 122 can include multiple interior cores to allow the radiator 122 to handle multiple types of fluids simultaneously. For example, the radiator 122 can be configured to cool a hydraulic fluid and an engine coolant. In other embodiments, the radiator 122 is configured to charge an air cooler, an air conditioning condenser, and/or a fuel cooler (such elements not shown).

The radiator fan 124 is configured to provide an air flow over the radiator to aid in cooling fluid contained within the radiator 122. In some embodiments, the radiator fan 124 is powered by a motor 130. In some embodiments, the radiator fan 124 pulls air across the radiator 122. Pulling air creates an even air flow across the radiator 122. This is advantageous when the radiator fan 124 is positioned in a non-parallel manner, as is the case with the depicted radiator fan 124. As shown, the radiator fan 124 is positioned in an angled orientation with respect to the radiator 122. In other embodiments, the radiator fan 124 may be arranged to push air across the radiator 122.

The cladding 128 is configured to aid in containing and channeling air within the cooling package 121. In the depicted embodiment, a fan cage 132 is attached to the cladding 128. The fan cage 132 allows for air to pass in and out of the cooling package and also acts to protect the radiator fan 124. In some embodiments, the cladding 128 has mounting features so that the cladding 128 and the overall cooling package 121 can be mounted to the side walls 120 of the engine housing 112.

Figure 10:
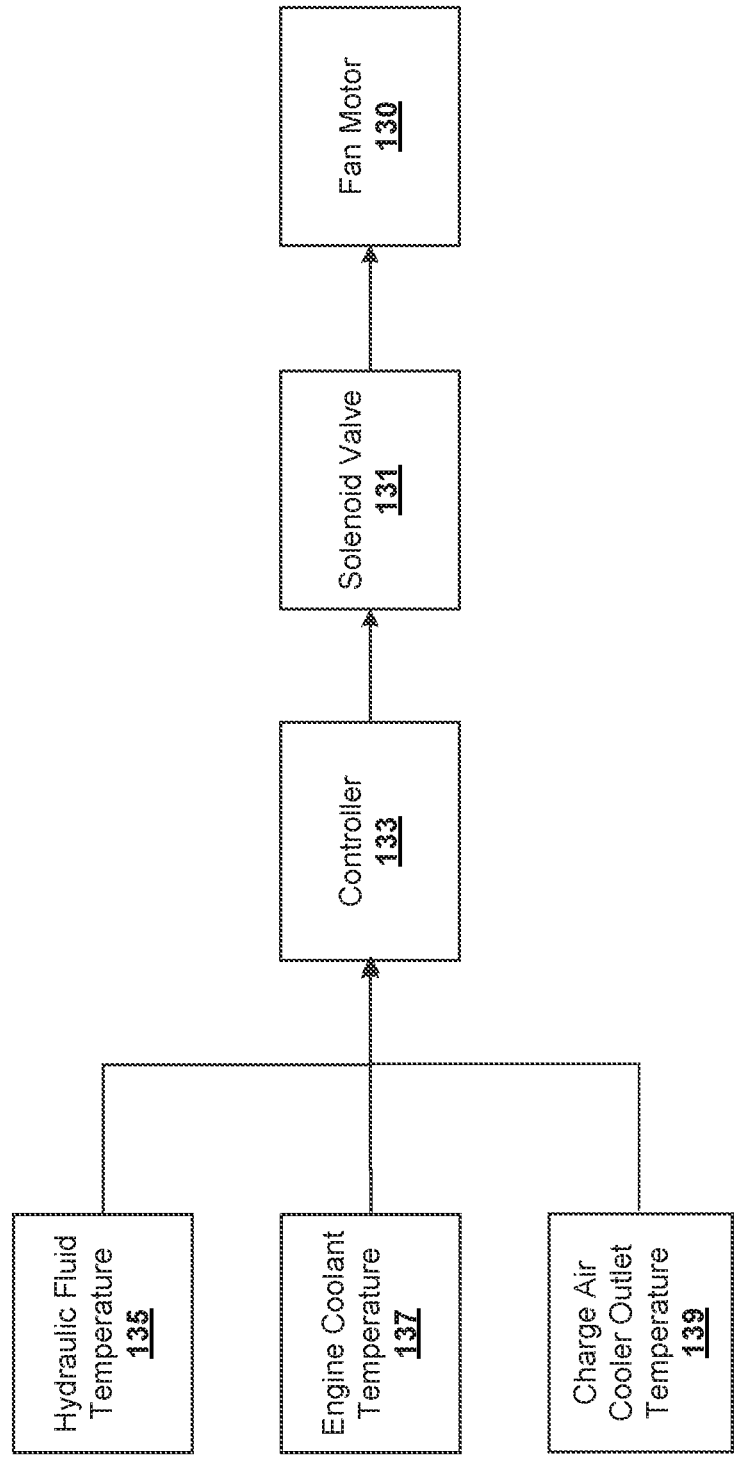
FIG. 10 illustrates a schematic diagram of a radiator fan control system, according to one embodiment of the present disclosure.

FIG. 10 shows a schematic diagram for fan speed control. In the depicted embodiment, the motor 130 that is coupled to and powers the fan 124 is a hydraulic motor. In some embodiments, the motor 130 includes a solenoid valve 131 that is configured to control the output of the motor 130 by altering the flow of hydraulic fluid through the motor 130. By altering the flow of hydraulic fluid, the overall speed of the radiator fan 124 is also altered. In some embodiments, a controller 133 is used to control the operation of the solenoid valve 131. The controller 133 is configured to control the operation of the solenoid valve 131 by monitoring certain engine functions and adjusting the valve 131 according to preset parameters. These engine functions can be in the form of inputs that are relayed to the controller 133 and can include hydraulic fluid temperature 135, engine coolant temperature 137, and charger air cooler outlet temperature 139. Other inputs that are representative of engine function may also be used.

For example, the controller 133 can monitor the temperature of the hydraulic fluid in a hydraulic reservoir and control the solenoid valve 131 accordingly. For example, if the hydraulic fluid is at a low temperature based on preset values stored in the controller 133, the valve 131 can be moved to limit flow of hydraulic fluid in the motor 130 so as to minimize horsepower load on the engine and to speed up the time required for the hydraulic fluid to reach operating temperature. Additionally, the controller 133 can monitor the temperature of the engine coolant at certain points in the cooling system and control the operation of the solenoid valve 131. For example, if the coolant is at a high temperature, the controller 133 can determine that more air flow is needed across the radiator 122 to cool the coolant. When this is determined, the valve 131 can be operated to allow more hydraulic fluid to flow through the motor 130, thereby increasing the output of the motor 130 and increasing the operating speed of the fan 124. In another example, the controller 133 may receive an input that is representative of the charge air cooler outlet temperature. The controller 133 may also receive a value that is representative of the ambient temperature around the machine 100. The difference between the charge air outlet temperature and the ambient temperature can then be used by the controller 133 to adjust the operation of the fan 124. The use of a controller 133 allows the overall engine system to adapt to changing circumstances within the system. Additionally, the controller helps to improve efficiency and aids in reducing opportunity for malfunctions.

In some embodiments, the motor 130 is an electric motor. In such an embodiment, the controller 133 can provide an input command directly to the motor 130 based on inputs provided to the controller 133 that are representative of engine operation.

The speed at which the radiator fan 124 operates is important to both the proper air flow across the radiator 122 and the sound the fan 124 produces. The noise generated by the fan 124 consists of a combination of discrete frequency noise related to the blade passing frequency (BPF) and its higher harmonics. The BPF of the fan 124 is defined as the number of revolutions the fan makes per second, multiplied by the number of fan blades on the fan. Therefore, reducing the BPF reduces the higher frequency sound of the fan, which reduces the overall dB(A) rating of the directional drilling machine 100 to which the radiator fan 124 is attached.

In some embodiments, the radiator fan operates at a maximum BPF of between about 210 Hz and 220 Hz. In other embodiments, the radiator fan 124 operates at a maximum BPF of about 216 Hz.

Figure 11:
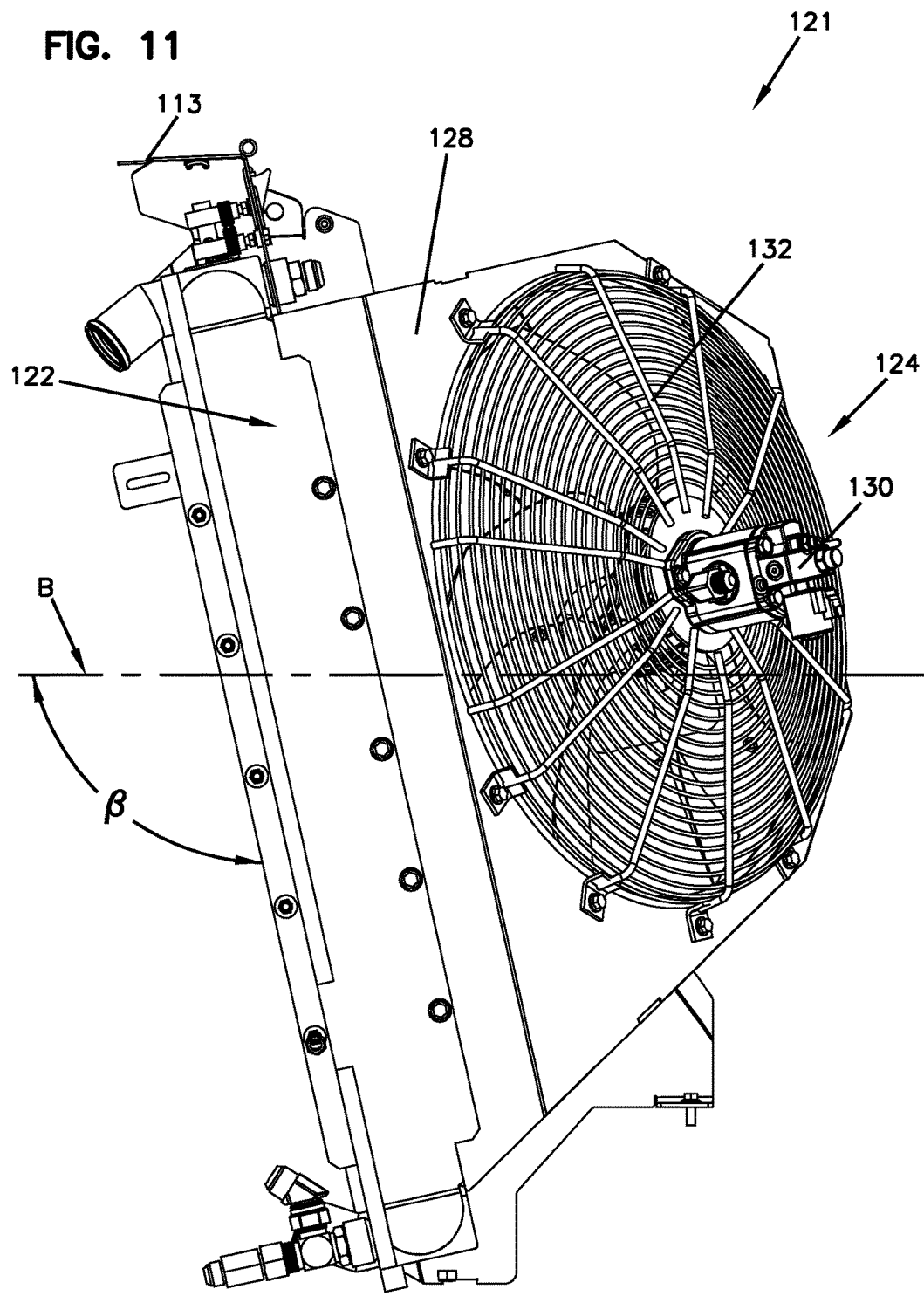
FIG. 11 illustrates a side view of the cooling package of FIG. 9.

FIG. 11 shows a side view of the cooling package 121, including the radiator cover 113. In the depicted embodiment, the radiator 122 is mounted at an angle β with respect to the horizontal reference plane B. In some embodiments, the angle β is between about 95 degrees and 135 degrees.

Figure 12:
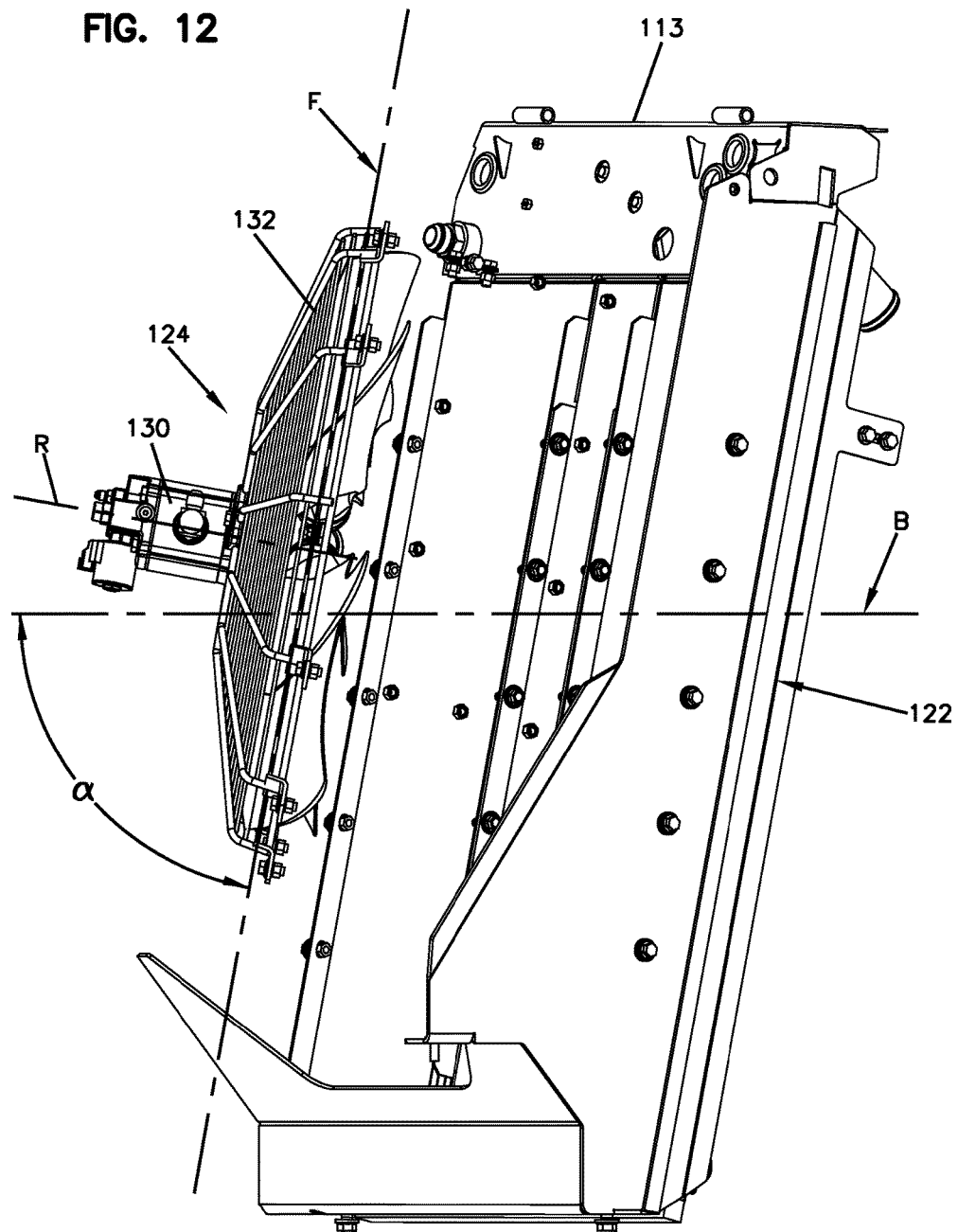
FIG. 12 illustrates a rear perspective view of the cooling package of FIG. 9.

FIG. 12 shows a perspective view of the cooling package 121 with a portion of the cladding 128 removed. In the depicted embodiment, the fan plane F is angled in a direction toward the radiator 122. The fan plane F forms an angle γ with the horizontal reference plane B. In some embodiments, angle γ is between about 60 degrees and about 85 degrees.

When combining angle γ and angle α, an oblique angle is created. The oblique angle is preferably a compound angle including a miter angle/component γ and a bevel angle/component α. The miter angle γ is defined relative to the horizontal reference plane B, which is perpendicular to the vertical reference plane A. The bevel angle α is defined relative to the vertical reference plane A. Therefore, it can be said that the fan 124 forms a compound angle with the engine housing 112.

Figure 13:
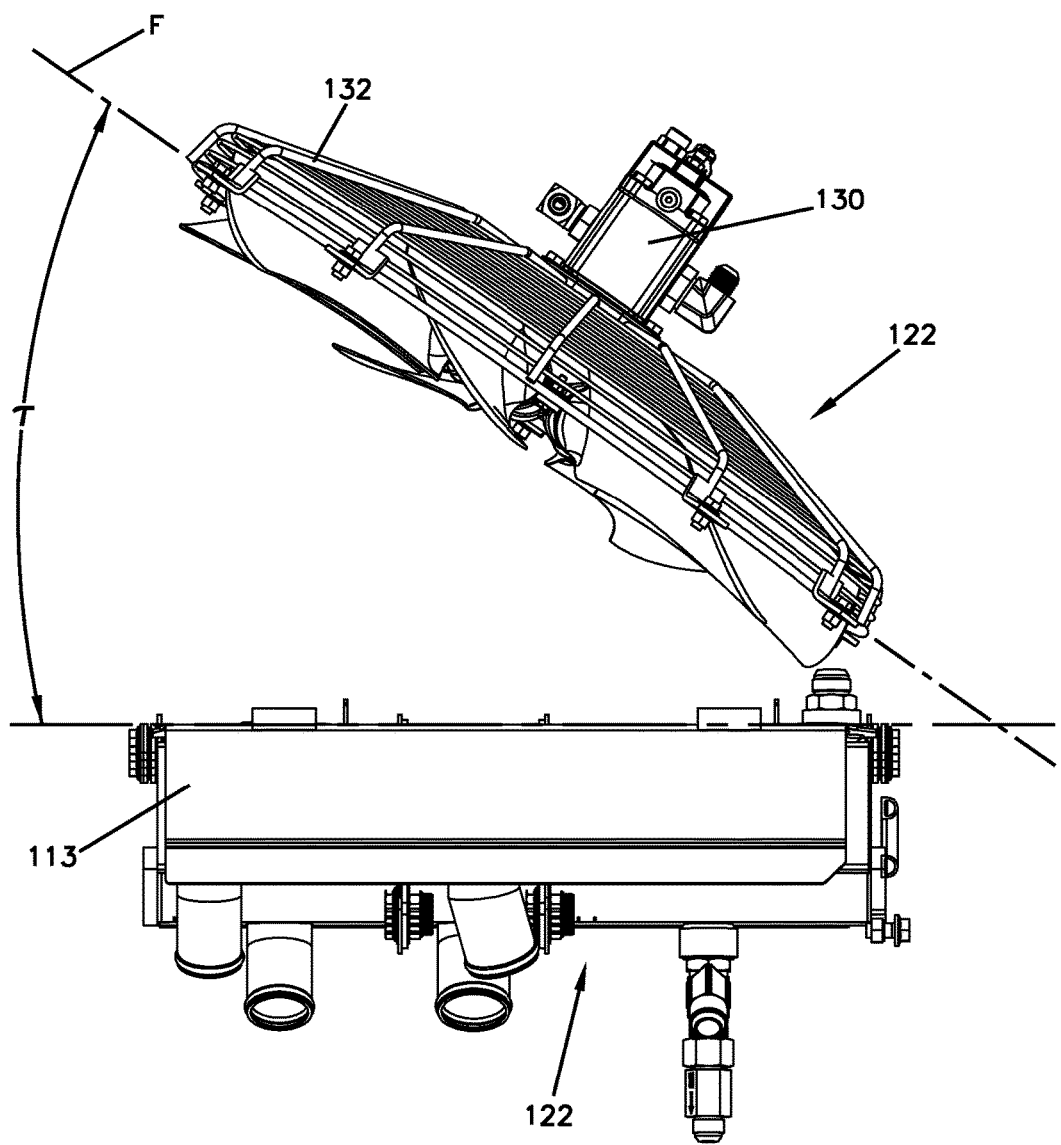
FIG. 13 illustrates a top view of the radiator and the radiator fan of the cooling package of FIG. 9, according to one embodiment of the present disclosure.

FIG. 13 shows a top view of the radiator 122 and the radiator fan 124. No cladding 128 is shown. As shown, the radiator fan 124 is positioned at an angle with respect to the radiator 122. Specifically, the fan plane F makes an angle τ with the radiator. In some embodiments, the angle τ is between about 30 degrees and about 45 degrees.

Figure 14:
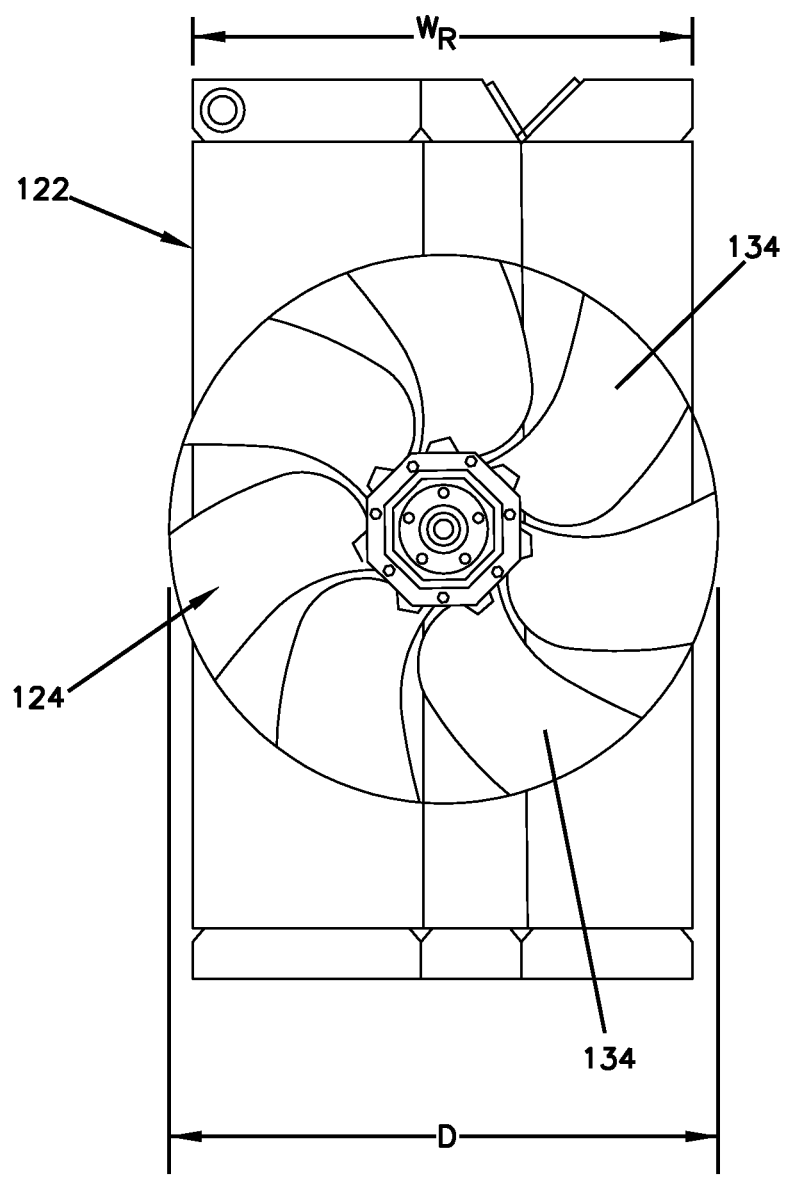
FIG. 14 illustrates a schematic front view of the radiator and the radiator fan of FIG. 13.

FIG. 14 is a schematic view showing the radiator 122 and the fan 124. The radiator 122 and fan 124 are shown positioned generally parallel with one another for illustration purposes.

The fan 124 is shown to have a plurality of blades 134. In the depicted embodiments, the fan includes seven blades. In other embodiments, the fan includes between six and ten blades. Also, as shown, the fan 124 has a diameter D which is greater than a width $W_r$ of the radiator 122. Such sizing of the radiator fan 124 and the radiator 122 is uncommon in cooling system designs. In some embodiments, the radiator fan 124 diameter D is at least 1.05 times larger than the width $W_r$ of the radiator 122. In other embodiments, the radiator fan 124 diameter D is at least 1.25 times larger than the width $W_r$ of the radiator 122. In some embodiments, the width $W_r$ of the radiator 122 is between about 24.0 and about 26.0 inches. In some embodiments, the width of the radiator is about 24.8 inches. Also, in some embodiments, the fan diameter D is between about 26.50 inches and about 28.50. In some embodiments, the fan diameter D is about 27.25 inches.

Figure 15:
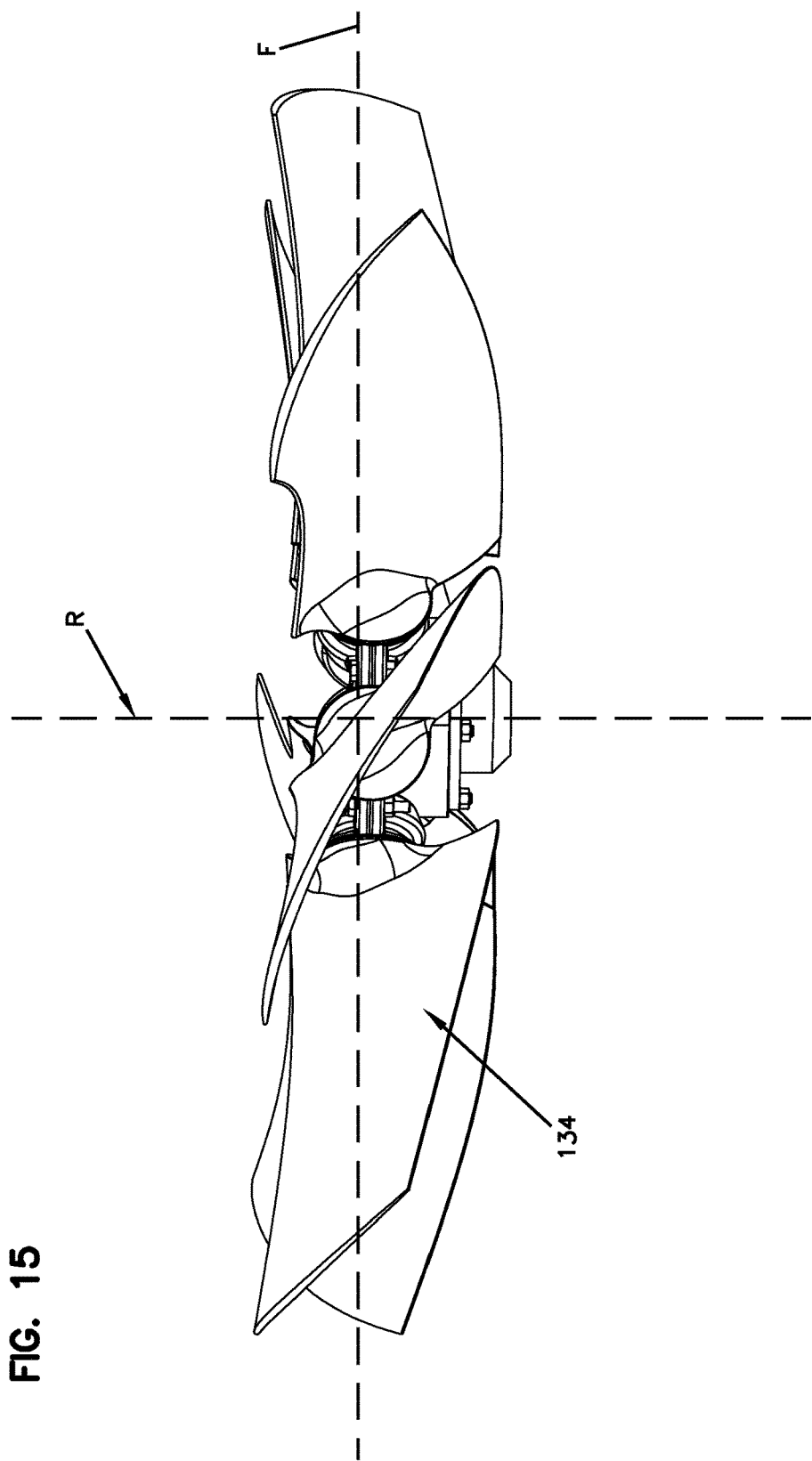
FIG. 15 illustrates a top view of the radiator fan of FIG. 13.
Figure 16:
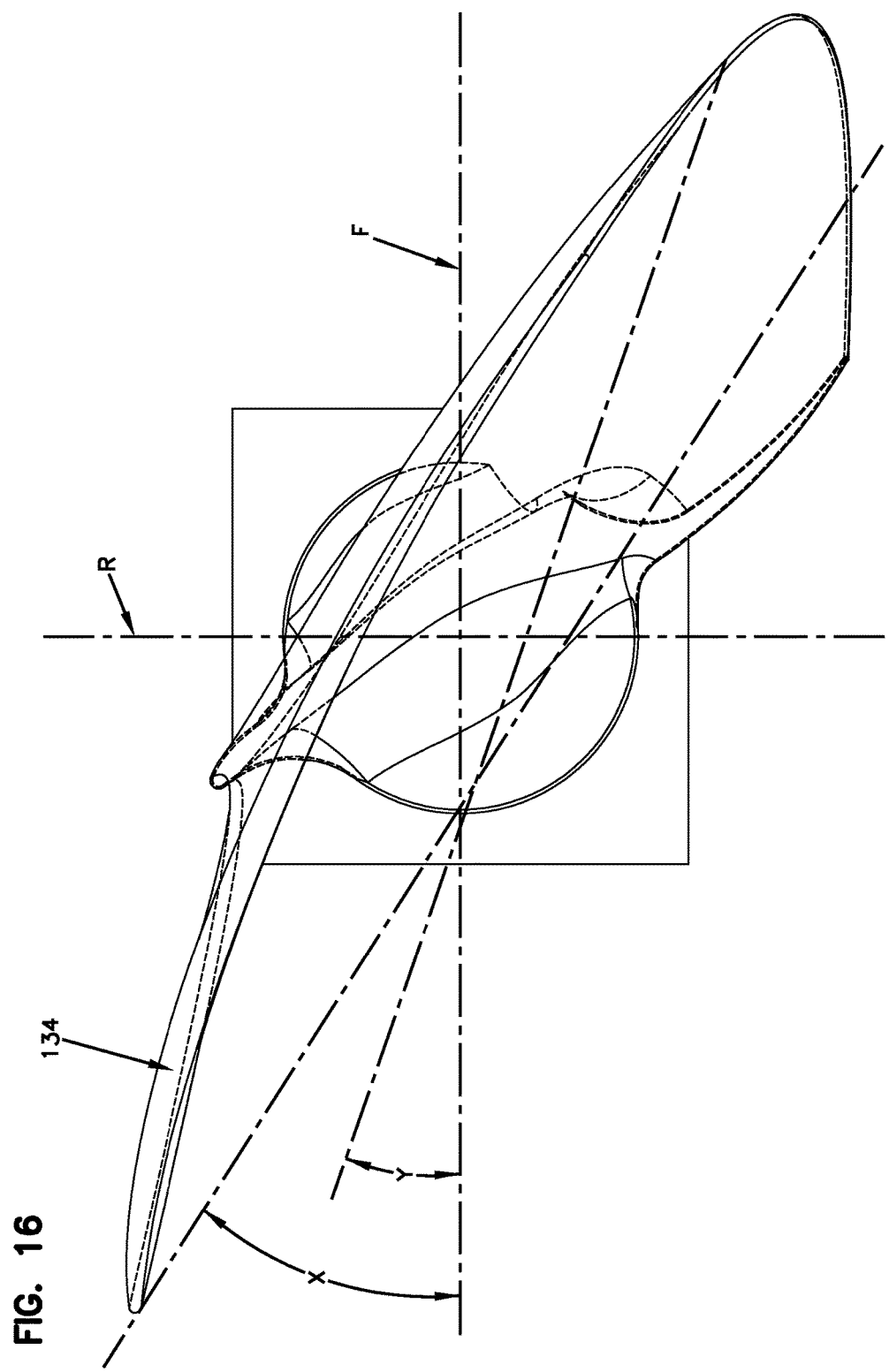
FIG. 16 illustrates a schematic top view of a radiator fan blade, according to one embodiment of the present disclosure.

FIG. 15 shows a top view of the radiator fan 124 along the fan plane F. FIG. 15 shows a single blade 134. As shown, each blade 134 is pitched at an angle x, i.e. non-perpendicular, from the fan plane F. By pitching the fan blades 134, the fan blades 134 are able to cause airflow when the fan 124 is rotated about its axis of rotation R. A fan's ideal mechanical efficiency is obtained when operated at an ideal operational speed when the fan blades are at an ideal blade pitch. As shown, the fan 124's ideal blade pitch is shown as angle y from the fan plane F. However, in the depicted in embodiment, the actual fan blade pitch x is an angle that is about 4.00 degrees greater than the ideal blade pitch y. In some embodiments, the fan blade pitch x is between about 37 degrees and 39 degrees. In other embodiments, the fan blade pitch x is about 37.5 degrees. Such a design decision purposely makes the fan 124 less mechanically efficient. However, by operating the radiator fan 124 at a lower than ideal rotational speed, pitching the blades 134 at a higher than ideal pitch, and increasing the overall diameter of the fan 124, the air flow required by the radiator 122 is reduced and a lower dB(A) sound rating for the fan 124 is achieved.

While the present disclosure can be implemented in a directional drilling machine, as described above, it can also be implemented in variety of other different machines. In some embodiments, the present disclosure can be used in industrial equipment such as tractors, brush chippers, stump cutters, horizontal grinders, trenchers, or other machines that can be operated in an environment where sound reduction measures are useful (e.g., urban or suburban environments).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. A horizontal directional drilling machine comprising:
a drive member adapted to be coupled to a proximate end of a drill string and generally configured for applying a thrust and rotational force to the drill string;
a housing having a housing length and a housing width, the housing defining a housing axis that extends along the housing length, the housing axis defining a vertical reference plane, the vertical reference plane being perpendicular to a ground surface on which the horizontal directional drilling machine is resting, the housing further including a plurality of side walls that extend along the housing length, the housing width being defined between the side walls;
an internal combustion engine positioned within the housing and coupled to the drive member;
a radiator positioned within the housing; and
a radiator fan configured to provide air flow across the radiator, the radiator fan having a diameter greater than the housing width and a width of the internal combustion engine, the radiator fan further defining a fan plane perpendicular to an axis of rotation of the radiator fan, wherein the radiator fan is positioned between the side walls of the housing so that the fan plane is at a non-perpendicular angle with respect to the vertical reference plane.

2. The horizontal directional drilling machine of claim 1, wherein the housing has a front and a rear portion, the front portion housing the internal combustion engine and the rear portion housing the radiator and radiator fan, the rear portion also including a plurality of louvers, the louvers being positioned to deflect air flow in a direction toward the front of the housing.

3. The horizontal directional drilling machine of claim 2, wherein the radiator fan is configured to pull air across the radiator and expel air past the louvers.

4. The horizontal directional drilling machine of claim 1, wherein the radiator has a width equal to the housing width.

5. The horizontal directional drilling machine of claim 1, wherein the radiator fan is positioned at an angle between 35 degrees and 45 degrees with respect to the vertical reference plane.

6. The horizontal directional drilling machine of claim 5, wherein the radiator fan is positioned at an angle of 36 degrees with respect to the vertical reference plane.

7. The horizontal directional drilling machine of claim 1, wherein the radiator fan has a diameter at least 1.05 times larger than the width of the housing.

8. The horizontal directional drilling machine of claim 1, wherein the radiator fan has a diameter at least 1.25 times larger than the width of the housing.

9. The horizontal directional drilling machine of claim 1, wherein the radiator is configured to cool at least one of a hydraulic fluid and an engine coolant.

10. The horizontal directional drilling machine of claim 1, wherein the radiator fan is configured to pull air across the radiator.

11. The horizontal directional drilling machine of claim 1, wherein the radiator fan has a plurality of fan blades, each fan blade having a fan blade pitch of between 37 degrees and 39 degrees with respect to the fan plane.

12. The horizontal directional drilling machine of claim 1, wherein the radiator fan is configured so as to rotate at a maximum blade frequency of 220 hertz or less.

13. A horizontal directional drilling machine comprising:
a drilling assembly adapted to be coupled to a proximate end of a drill string and generally configured for applying a thrust and rotational force to the drill string;
a housing having a housing length and a housing width, wherein the housing length is greater than the housing width, the housing defining a housing axis that extends along the housing length, the housing axis defining a vertical reference plane, the vertical reference plane being perpendicular to a ground surface on which the horizontal directional drilling machine is resting, the housing axis further defining a horizontal reference plane perpendicular to the vertical reference plane, the housing further including a plurality of side walls that extend along the housing length, the housing width being defined between the side walls, the housing further including a convertible hood being pivotable between an open and closed position along a hinge, the hinge being positioned at a compound angle with respect to the housing axis, the compound angle including a bevel component angle angled with respect to the vertical reference plane and a miter component angle angled with respect to the horizontal reference plane, wherein at least one of the miter component angle and the bevel component angle is between 15 degrees and 45 degrees; and an internal combustion engine positioned within the housing and coupled to the drilling assembly.

14. The horizontal directional drilling machine of claim 13, further comprising a radiator positioned within the housing, and wherein the hood provides access to the radiator when in the open position.

* * * * *